United States Patent
Ross et al.

(10) Patent No.: US 7,142,099 B2
(45) Date of Patent: Nov. 28, 2006

(54) METHOD AND SYSTEM FOR PROVIDING FLEXIBLE VEHICLE COMMUNICATION WITHIN A VEHICLE COMMUNICATIONS SYSTEM

(75) Inventors: Steven J. Ross, Madison Heights, MI (US); Stephen C. Habermas, Beverly Hills, MI (US); Vinodh C. Ravi, Auburn Hills, MI (US)

(73) Assignee: General Motors Corporation, Detroit, MI (US)

( * ) Notice: Subject to any disclaimer, the term of this patent is extended or adjusted under 35 U.S.C. 154(b) by 644 days.

(21) Appl. No.: 10/654,302

(22) Filed: Sep. 3, 2003

(65) Prior Publication Data

US 2005/0050017 A1 Mar. 3, 2005

(51) Int. Cl.
*B60Q 1/00* (2006.01)
*G08B 1/00* (2006.01)
*G08B 1/08* (2006.01)
*G06F 7/00* (2006.01)
*G06F 19/00* (2006.01)
*G01C 11/30* (2006.01)

(52) U.S. Cl. .............. 340/438; 340/425.5; 340/531; 340/539.1; 340/5.72; 701/29; 701/30; 701/31; 701/32; 701/33; 701/209; 701/210; 701/211; 701/212; 701/213; 455/456.1; 455/456.2; 455/414.1; 455/39; 455/73; 455/91; 455/99

(58) Field of Classification Search .............. 340/438, 340/425.5, 5.7, 531, 539.1; 701/2, 29–33, 701/207–213; 455/456.1, 456.2, 414.1
See application file for complete search history.

(56) References Cited

U.S. PATENT DOCUMENTS

| 6,640,186 | B1 * | 10/2003 | Stefan ...................... 701/209 |
| 6,662,091 | B1 * | 12/2003 | Wilson et al. ............... 701/33 |
| 6,728,612 | B1 * | 4/2004 | Carver et al. ................ 701/33 |
| 6,754,570 | B1 * | 6/2004 | Iihoshi et al. ................ 701/33 |
| 7,031,724 | B1 * | 4/2006 | Ross et al. ............... 455/456.1 |
| 2003/0231550 | A1 * | 12/2003 | Macfarlane ................ 367/198 |
| 2004/0198255 | A1 * | 10/2004 | Hayashida ................... 455/99 |

* cited by examiner

*Primary Examiner*—Daniel Wu
*Assistant Examiner*—Lam Pham
(74) *Attorney, Agent, or Firm*—Cardinal Law Group

(57) ABSTRACT

A method is directed to providing a custom message set within a vehicle message service system. The method includes receiving at least one vehicle message service request, determining at least one set of vehicle parameters based on the at least one received vehicle message service request, requesting at least one vehicle message for each of the at least one set of vehicle parameters from a database, and generating the custom message set responsive to the vehicle messages. The method may further include transmitting the generated custom message set to a vehicle client. The step of generating the custom message set responsive to the received vehicle parameters may include receiving a vehicle message for each of the at least one set of vehicle parameters from the database and producing an object including the vehicle messages.

19 Claims, 3 Drawing Sheets

METHOD AND SYSTEM FOR PROVIDING FLEXIBLE VEHICLE COMMUNICATION WITHIN A VEHICLE COMMUNICATIONS SYSTEM

FIELD OF THE INVENTION

In general, the invention relates to data transmission over a wireless communication system. More specifically, the invention relates to a method and system for providing flexible vehicle communication within a vehicle communication system.

BACKGROUND OF THE INVENTION

Mobile communication units (MCU's), such as cellular phones, personal data assistants (PDA's), and on-board Vehicle Communication Units (VCU's), used in conjunction with a Wide Area Network (WAN), such as a cellular telephone network or a satellite communication system, have made it possible for a person to send and receive voice communications, data transmissions, and FAX messages from virtually anywhere on earth. Such communication is initiated at the MCU when it is turned on, or by entering a phone number to be called, or in many cases, by pressing a preprogrammed button on the MCU or speaking a voice command causing the MCU to automatically complete the process of dialing the number to be called. A radio communication link is established between the MCU and a Wide Area Network (WAN), using a node of the WAN in the vicinity of the MCU.

In cellular telephone systems, a router is commonly referred to as a "cellular base station." Once the radio communication link between the MCU and the cellular base station has been established, the base station then utilizes a combination of additional cellular stations, conventional telephone wire line networks, and possibly even satellite systems to connect the MCU to the number or data node (e.g. IP address) to be accessed.

Wireless communication services for MCU users, such as navigation and roadside assistance, have increased rapidly in recent years. Services offered are for either a motor vehicle in operation or a non-operational motor vehicle. Services offered for a motor vehicle in operation include navigation assistance, stolen vehicle tracking, remote diagnostics, and the like. Services offered for a non-operational motor vehicle include remote door-lock release, emergency services, remote horn and lights, and the like.

MCU service providers must make available a wireless communication service customer assistance center (or other such manually staffed service center) in order that an operator or customer assistant may complete the MCU requests. Recently, some MCU service providers have made access to MCU requests available to the customer via the Internet and the World Wide Web. This availability has allowed customers to modify the many different options available within the vehicle depending on vehicle equipment and the service-level the customer has purchased.

Conventional vehicles receive specific embedded logic at the time of manufacture, and as new model year vehicles become available with new service-levels older models likely will not be retrofitted due to cost factors. Unfortunately, this presents a number of negative issues for the manufacturer, such as, for example requiring future products to provide legacy support.

It would be desirable, therefore, to provide a method and system that would overcome these and other disadvantages.

SUMMARY OF THE INVENTION

One aspect of the invention includes a method for providing a custom message set within a vehicle message service system. The method includes receiving at least one vehicle message service request, determining at least one set of vehicle parameters based on the at least one received vehicle message service request, requesting at least one vehicle message for each of the at least one set of vehicle parameters from a database, and generating the custom message set based on the vehicle messages.

In accordance with another aspect of the invention, a computer readable medium storing a computer program includes: computer readable code for determining at least one set of vehicle parameters based on at least one received vehicle message service request; computer readable code for requesting at least one vehicle message for each of the at least one set of vehicle parameters from a database; and computer readable code for generating the custom message set responsive to the vehicle messages.

In accordance with yet another aspect of the invention, a system for providing a custom message set within a vehicle message service system is provided. The system includes means for receiving at least one vehicle message service request. The system additionally includes means for determining at least one set of vehicle parameters based on the at least one received vehicle message service request. Means for requesting at least one vehicle message for each of the at least one set of vehicle parameters from a database is provided. Means for generating the custom message set responsive to the vehicle messages is also provided.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Illustrative Operating Environment

Figure 1:
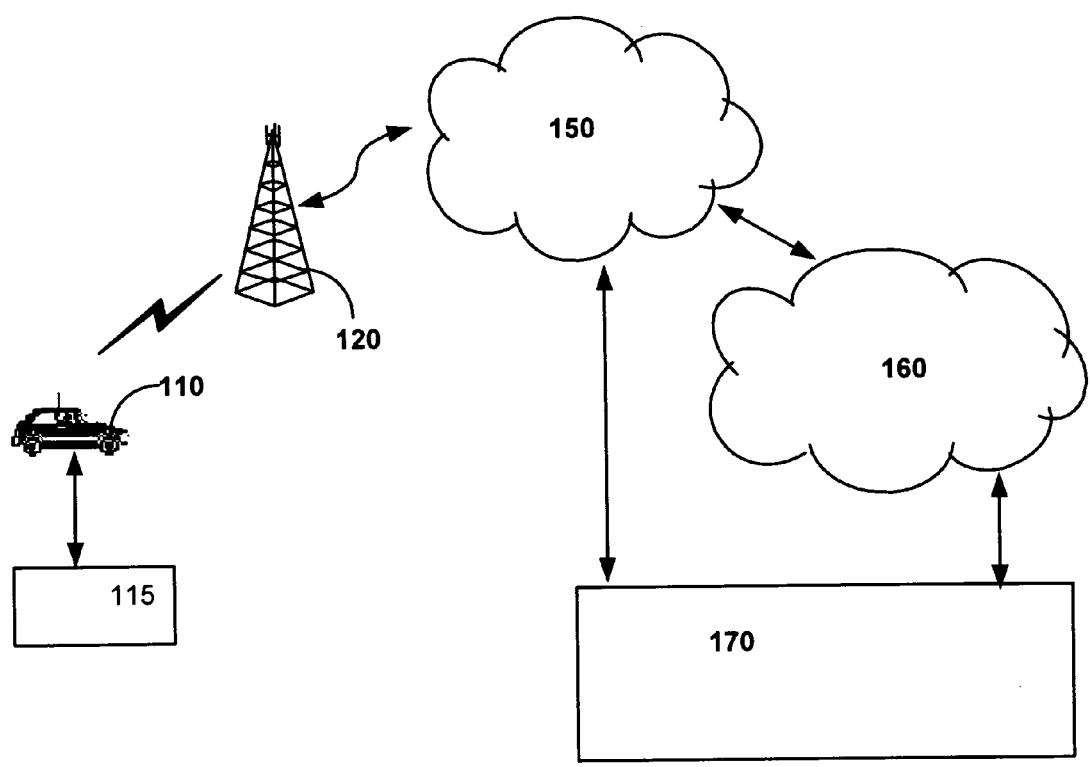
FIG. 1 is a block diagram illustrating an operating environment in accordance with one embodiment of the present invention.

FIG. 1 is a block diagram illustrating an example of an operating environment that is in accordance with the present invention. FIG. 1 details an embodiment of a system for operating a wireless communication service in a mobile vehicle, and may be referred to as a mobile vehicle communication system (MVCS) 100. The mobile vehicle communication system (MVCS) 100 may include one or more mobile vehicle communication units (MVCU) 110, one or more MVCS devices 115, one or more wireless communication systems 120, one or more communication networks 150, one or more land networks 160, and one or more service providers 170. In an example, MVCS 100 is implemented as an OnStar® system available from OnStar® Corp., a subsidiary of General Motors Corp. of Troy, Mich., as is known in the art.

MVCU 110 includes a wireless vehicle communication device (module, MVCS module) such as an analog or digital phone with suitable hardware and software for transmitting and receiving data communications. In one embodiment, MVCU 110 further includes a wireless modem for transmitting and receiving data. In another embodiment, MVCU 110 includes a digital signal processor with software and additional hardware to enable communications with the mobile vehicle and to perform other routine and requested services.

In operation, MVCU 110 sends and receives radio transmissions from wireless communication system 120. MVCU 110 may also be referred to as a mobile vehicle throughout the discussion below. MVCU 110 may be implemented as a motor vehicle, a marine vehicle, or as an aircraft.

MVCS device 115 includes hardware suitable for receiving broadcast signals within MVCU 110. In one embodiment, MVCS device 115 includes a receiver and receives broadcasts from wireless communication system 120. In another embodiment, MVCS device 115 further includes a medium for storing programming information. In an example, the programming information includes provider supplied programs.

In yet another embodiment, MVCS device 115 further includes an audio speaker, a synthesized voice output, an audio channel, or the like. In an example, MVCS device 115 is implemented, in addition to the receiver, as a set of headphones, the audio portion of a television, a display device, or the like.

In another embodiment, MVCU 110 includes a speech recognition system (ASR) module capable of communicating with MVCS device 115. In yet another embodiment, the module is capable of functioning as any part or all of the above communication devices and, for another embodiment of the invention, may be capable of data storage, and/or data retrieval, and/or receiving, processing, and transmitting data queries.

Wireless communications system 120 is a wireless communications carrier or a mobile telephone system and transmits to and receives signals from one or more MVCU 110. Wireless communication system 120 incorporates any type of telecommunications in which electromagnetic waves carry signal over part of or the entire communication path.

In an example, such wireless communication carrier is an analog mobile telephone system operating over a prescribed band nominally at 800 MHz. In another example, such wireless communication carrier is a digital mobile telephone system operating over a prescribed band nominally at 800 MHz, 900 MHz, 1900 MHz, or any suitable band capable of carrying mobile communications. Examples of such digital mobile telephone systems include code division multiple access (CDMA) (e.g. IS-95), Groupe Special Mobile (GSM), and time division multiple access (TDMA).

In yet another example, such wireless communication carrier is a short message service (SMS), modeled after established protocols such as IS-637 SMS standards, IS-136 air interface standards for SMS, and GSM 03.40 and 09.02 standards. Similar to paging, an SMS communication could be broadcast to a number of regional recipients.

Other wireless communication carriers include IEEE's 802.11 standard, Bluetooth® available from Microsoft® Corp. of Redmond, Wash., and the like.

Communications network 150 is implemented as any suitable system or collection of systems for connecting wireless communications system 120 to at least one MVCU 110 or to a service provider 170. In one embodiment, communications network 150 includes a mobile switching center and provides services from one or more wireless communications companies.

Land network 160 connects communications network 150 to service provider 170. In one embodiment, land network 160 is implemented as a public-switched telephone network, a wired network, an optical network, a fiber network, another wireless network, or any combination thereof. In an example, land network 160 includes an Internet protocol (IP) network. In another embodiment, an MVCU 160 utilizes all or part of the wireless communications system 120, communications network 150, and land network 160.

In yet another embodiment, land network 160 connects one or more communications systems 120 to one another. In another embodiment, communication network 150 and land network 160 connect wireless communications system 120 to a communication node or service provider 170.

Service provider 170 is implemented as one or more locations where communications may be received or originate to facilitate functioning of the mobile vehicle communication system (MCVS) 100. Service provider 170 may contain any of the previously described functions.

In one embodiment, service provider 170 is implemented as a call center, as known in the art. The service provider 170 can be implemented in any number of configurations, such as, for example as a voice and/or data call center providing verbal and/or data communications between an advisor and/or advisor data applications in the call center and a subscriber within or outside of a mobile vehicle, as a voice activated call center providing verbal communications between an ASR unit and a subscriber in a mobile vehicle, or as an Internet service providing communications between a subscriber using a client application with a user interface and backend services. In an example, the call center is implemented to service an OnStar® system including one or more of the above examples, such as, an OnStar® Virtual Advisor service providing a voice activated call center to service an OnStar® system.

Figure 2:
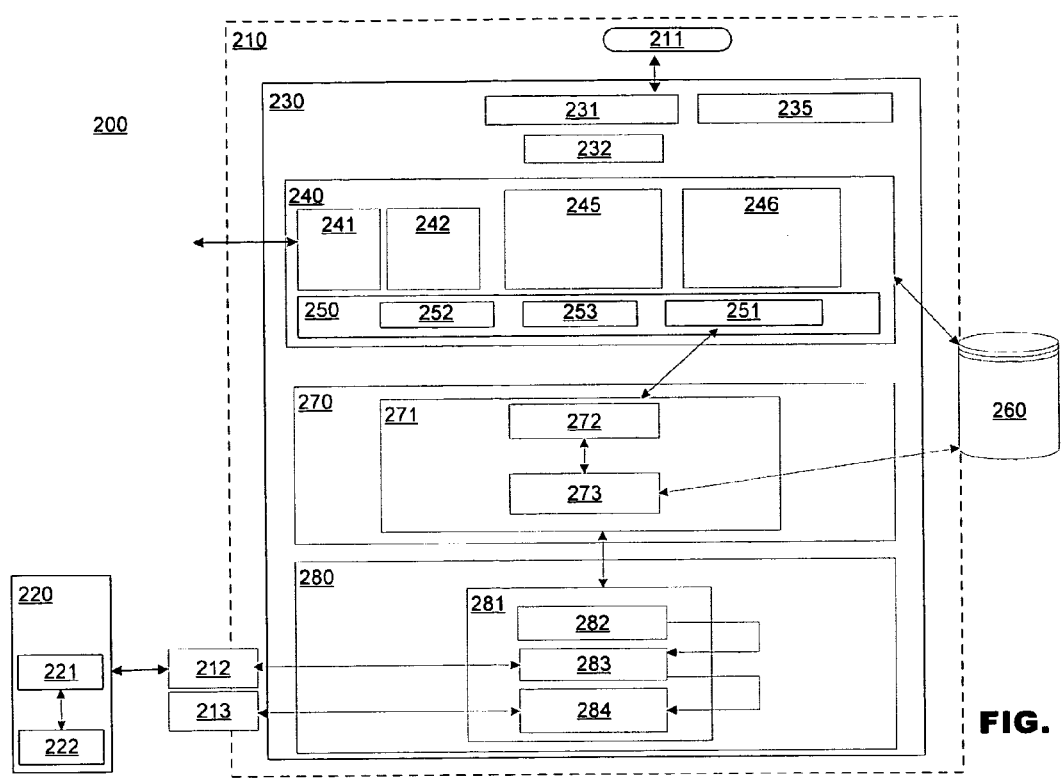
FIG. 2 is a block diagram illustrating a system for providing a custom message set in accordance with one embodiment of the present invention.

FIG. 2 is a block diagram illustrating a system 200 for providing a custom message set in accordance with one embodiment of the present invention. System 200 includes a system server 210 and a vehicle client 220. System 200 may include additional components not relevant to the present discussion.

Server 210 is a server-side system that includes web-client application 211, modem banks 212–213, application server 230, and database 260. In one embodiment, server 210 is implemented as an OnStar call center, such as, for example service provider 170 of FIG. 1 above. Web-client application 211 is a portal allowing access to/from server 210 from outside sources, such as, for example the Internet and the World Wide Web. In one embodiment, web-client application 211 is implemented as an end user website. Modem banks 212–213 allow server 210 to access vehicle client 220. In an example and referring to FIG. 1 above, modem banks 212–213 are part of service provider 170 and provide access to MVCU 110 via communications network 150 and/or land network 160 and wireless communications system 120.

Vehicle client 220 includes a vehicle communication services (VCS) application 221 and vehicle bus 222. VCS application 221 is a software framework that receives proprietary over-the-air messaging schemes and passes the custom message set including vehicle messages to vehicle bus 222 for execution.

Application server 230 is an Internet/World Wide Web application server operating within server 210 that facilitates operation of software applications operating within application server 230 as well as providing conduits into and out of application server 230. In one embodiment, application server 230 is implemented as a WebLogic application server available from BEA™ Systems, INC. of San Jose, Calif. Database 260 receives and stores data from as well as locates and sends requested data to application server 230 and related applications operating within application server 230. In one embodiment, database 260 stores user profile information, such as, for example service-level information and vehicle type information including vehicle specific data as well as other relevant information discuss below. Database 260 may be implemented as any suitable database application or equivalent data repository, such as, for example Oracle® Database available from Oracle® Corp. of Redwood Shores, Calif.

Application server 230 includes portal application 240, common services application 270, and communication services application 280. Application server 230 further includes personal portal 231, portal skin 232, and remote administrative portal 235. Personal portal 231 and remote administrative portal 235 are web-based software frameworks that allow interaction between a client and an application operating within application server 230. In one embodiment, personal portal 231 provides interaction between a customer and an application operating within application server 230 via the Internet/World Wide Web. In this embodiment, portal skin 232 functions to provide mapping to a specific user profile and provides links to specific applications within portal application 240 based on predetermined criteria, such as, for example a service-level subscription and vehicle type. In another embodiment, administrative portal 235 provides interaction between a call center advisor and an application operating within application server 230 via an intranet. In this embodiment, operation within an intranet reduces security concerns by promoting call center advisor communication directly with portal application 240.

Portal application 240 is a web-based software framework that creates interaction between a client and an application operating within the portal application. Portal application 240 includes voice channel access port 241, wireless channel access port 242, remote doors portlet 245, additional portlets 246, and shared components 250. Voice channel access port 241 and wireless channel access port 242 are access ports that allow additional access avenues to portal application 240 for a client. In one example, voice channel access port 241 allows access to portal application 240 by a client via a voice channel device, such as, a cellular phone or other voice activated telecommunications device. In another example, wireless channel access port 242 allows access to portal application 240 by a client via a wireless device, such as, for example a Short Message Service (SMS) device or a Wireless Application Protocol (WAP) device.

Portlets (245 and 246) are applications that interact with a client and provide a client access to specific services based on predetermined criteria, such as, for example a service-level subscription and vehicle type. The portlets make use of the portal software framework connection to application logic behind the graphical user interface (GUI) to allow execution of desired services. In one embodiment, a portlet includes Java Server Pages (JSPs), webflows, and input processors to enable a client to access and interact with the portlet. In an example, if predetermined criteria have been met, remote doors portlet 245 provides a client access to remotely operating (unlocking) doors. In this example, a customer who has inadvertently locked his keys in a vehicle can contact a call center for assistance. The call center advisor, the client in this example, in turn enters portal application 240 via administrative portal 235 and accesses remote doors portlet 245. Additional portlets 246 represent any number of additional services offered based on a service-level subscription and a vehicle type. In an example, based on the service-level subscription and vehicle type, portlets allow the client (e.g., the customer in this example) to enter portal application 240 via personal portal 231 and portal skin 232, and access additional portlets 246 to send remote alerts or adjust vehicle personalization settings such as the length of time the dome light remains on after the vehicle is turned off.

Shared components 250 is an interface layer that collects portlet information and produces vehicle service message requests. Shared components 250 includes vehicle message service (VMS) request sender 251, vehicle information 252, and user information 253. VMS request sender 251 produces a request object based on a client request and the portlets associated with the request. Vehicle information 252 and user information 253 request and receive associated information from database 260 based on the client request and provide the information to VMS request sender 251 for encapsulating within the request object to be streamed to common services application 270.

Common services application 270 is a web-based software framework that supports interaction between applications operating within common services application 270 and applications operating within other web-based software frameworks, such as, for example portal application 240 and communication services application 280.

Common services application 270 includes vehicle message service (VMS) application 271 that receives a request object from VMS request sender 251 of shared components 250 and produces a custom message set. VMS application 271 includes request object parser 272 and database message query 273. Request object parser 272 is a parser that parses the received object to remove relevant elements, called vehicle parameters, for further processing. Database message query 273 is a software application that receives the vehicle parameters from request object parser 272 and produces a database query and forwards the database query to database 260 for processing.

Database message query 273 additionally receives vehicle messages from database 260 in response to the database query and produces a custom message set based on the received vehicle messages. The vehicle messages are machine-level instructions for vehicle bus 222 that allow applications running on application server 230 to communicate and manage vehicle client 220 regardless of any proprietary messaging scheme that vehicle client 220 is utilizing. In an example, vehicle messages may be implemented as any suitable messaging scheme or messaging set, such as, for example proprietary over-the-air messages, proprietary vehicle LAN messages (e.g. GM LAN and Class II messages), and other OEM vehicle bus messages. In an example, database 260 includes a look-up table having one or more vehicle messages for each vehicle parameter. In one embodiment, database message query 273 produces a message object, encapsulating the custom message set, and streams the message object to communication services application 280.

Communication services application 280 is a software framework that supports interaction between applications operating within communication services application 280 and applications operating within web-based software frameworks, such as, for example common services application 270. Communication services application 280 includes vehicle session manager (VSM) application 281 that receives a message object from database message query 273 of VMS application 271 and passes the custom message set to modem banks 212–213 for transmission to vehicle client 220. VSM application 281 includes manager 282, immediate queue 283, and delay queue 284. Manager 282 receives the custom message set from database message query 273 of common services application 270, assigns a priority value to the custom message set based on communication priorities, and passes the custom message set to immediate queue 283 and delay queue 284 based on transmission priority. In one embodiment, common services application 270 passes the custom message to immediate queue 283. Immediate queue 283 determines if the assigned priority value of the custom message set matches priority values within immediate queue 283. In this embodiment, if the assigned priority value of the custom message set does not match the priority values within immediate queue 283, the custom message set is passed to delay queue 284. Example communication priorities include the content of the custom message set, vehicle client conditions, message set size, and application related priority. Immediate queue 283 and delay queue 284 pass the custom message set to modem banks 212–213 per instruction.

In an example, a vehicle client condition indicating that the vehicle client is not operating may result in a lower priority value assigned as the vehicle client is only available for reception of transmission at specific times within the hour. In another embodiment, manager 282 receives a message object, including custom message set, from database message query 273 of common services application 270 and verifies that the custom message set is in acceptable format for transmission.

The present invention includes numerous advantages over the prior art including separation of logic for vehicle communication sessions from logic to communicate a vehicle function message. Additionally, data driven look-up of messages utilizes less resources and is easier to manage and extend than logic embedded in vehicle communication code. Finally, translation to proprietary over-the-air messages, proprietary vehicle LAN messages, and OEM vehicle bus messages can be executed in the database look-up and implemented on the server side thereby minimizing development and management within embedded in-vehicle software.

Figure 3:
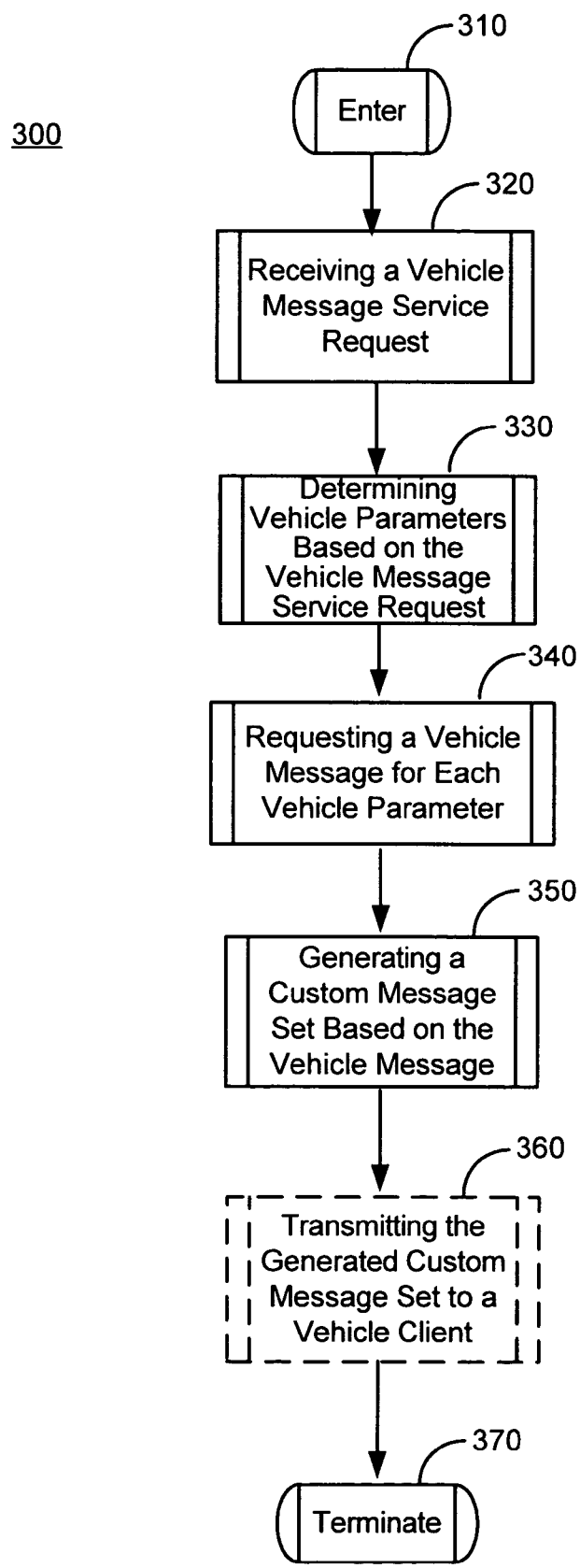
FIG. 3 is a flow diagram depicting an exemplary embodiment of code on a computer readable medium in accordance with the present invention.

FIG. 3 is a flow diagram depicting an exemplary embodiment of code on a computer readable medium in accordance with the present invention. FIG. 3 details an embodiment of a method 300 for providing a custom message set within a vehicle message service system, in accordance with the present invention. Method 300 may utilize one or more systems detailed in FIGS. 1 and 2 above. The present invention can also take the form of a computer usable medium including a program for configuring an electronic module within a vehicle. The program stored in the computer usable medium comprises computer program code for executing the method steps described in FIG. 3. Method 300 begins at block 310.

At block 320, a vehicle message service request is received. In one embodiment, the vehicle message service request includes vehicle information, service-level information, and at least one service request. In an example and referring to FIG. 2 above, VMS application 271 receives the vehicle message service request from VMS request sender 251.

At block 330, at least one set of vehicle parameters is determined based on the at least one received vehicle message service request. In one embodiment, the at least one set of vehicle parameters is determined by analyzing the received vehicle message service request for vehicle information, service-level information, and at least one service request. In this embodiment, the at least one set of vehicle parameters is further determined by producing a set of vehicle parameters for each service request and associated vehicle information and service-level information. In this embodiment, the at least one set of vehicle parameters is still further determined by producing a database query based on the at least one set of vehicle parameters.

In an example and referring to FIG. 2 above, request object parser 272 parses the received object to remove relevant elements, referred to as vehicle parameters, and including vehicle information, service-level information, and at least one service request. In this example, database message query 273 receives the vehicle parameters from request object parser 272 and produces a database query.

At block 340, at least one vehicle message is requested for each of the at least one set of vehicle parameters from a database. In one embodiment, the database includes a lookup table having at least one associated vehicle message for each of the at least one set of vehicle parameters. In an example and referring to FIG. 2, database message query 273 sends the database query to database 260.

At block 350, the custom message set is generated based on the vehicle messages. In one embodiment, the custom message set is generated by receiving a vehicle message for each of the at least one set of vehicle parameters from the database and producing an object including the vehicle messages. In an example and referring to FIG. 2 above, database message query 273 receives vehicle messages from database 260 in response to the database query and produces a custom message set based on the received vehicle messages.

At optional block 360, the generated custom message set is transmitted to a vehicle client. In one embodiment, the generated custom message set is transmitted by passing the custom message set to a vehicle session manager, assigning a priority value to the custom message set based on at least one communication priority value, passing the custom message set to one of a plurality of message queues based on the priority value, and transmitting the custom message set to the vehicle client based on the message queue the custom message set is located within. In one embodiment, communication priorities include the content of the custom message set, vehicle client conditions, message set size, and application related priority.

In an example and referring to FIG. 2 above, manager 282 receives the custom message set from database message query 273 of common services application 270 and assigns a priority value to the custom message set based on communication priorities. Manager 282 then passes the custom message set to immediate queue 283 or delay queue 284 based on transmission priority. Immediate queue 283 and delay queue 284 pass the custom message set to modem banks 212–213 per instruction. Modem banks 212–213 transmit the custom message set to the vehicle client.

At block 370, method 300 ends.

The above-described methods and implementation for providing a custom message set within a vehicle message service system are example methods and implementations. These methods and implementations illustrate one possible approach for providing a custom message set within a vehicle message service system. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

We claim:

1. A method for providing a custom message set within a vehicle message service system, the method comprising:
    receiving at least one vehicle message service request;
    determining at least one set of vehicle parameters based on the received vehicle message service request;
    requesting at least one vehicle message for the set of vehicle parameters from a database; and
    generating the custom message set based on the vehicle messages.

2. The method of claim 1, further comprising:
    transmitting the generated custom message set to a vehicle client.

3. The method of claim 2, wherein transmitting the generated custom message set to the vehicle client comprises:
    passing the custom message set to a vehicle session manager;
    assigning a priority value to the custom message set based on at least one communication priority value;
    passing the custom message set to one of a plurality of message queues based on the priority value; and
    transmitting the custom message set to the vehicle client based on the message queue the custom message set is located within.

4. The method of claim 3, wherein the at least one communication priority value is determined using factors selected from the group consisting of: the contents of the custom message set, vehicle client conditions, message set size, and application related priority.

5. The method of claim 1, wherein the vehicle message service request includes vehicle information, service-level information, and at least one service request.

6. The method of claim 1, wherein the method of determining at least one set of vehicle parameters comprises:
    analyzing the received vehicle message service request for vehicle information, service-level information, and at least one service request;
    producing a set of vehicle parameters for each service request and associated vehicle information and service-level information; and
    producing a database query based on the at least one set of vehicle parameters.

7. The method of claim 1, wherein the database includes a lookup table having at least one associated vehicle message for each of the at least one set of vehicle parameters.

8. The method of claim 1, wherein the method of generating the custom message set responsive to the received vehicle parameters comprises:
    receiving a vehicle message for each of the at least one set of vehicle parameters from the database; and
    producing an object including the vehicle messages.

9. The method of claim 1, wherein the vehicle messages are selected from the group consisting of: proprietary over-the-air messages, proprietary vehicle LAN messages, and OEM vehicle bus messages.

10. A computer readable medium for producing a custom message set within a vehicle message service system comprising:
    computer readable code for determining at least one set of vehicle parameters based on at least one received vehicle message service request;
    computer readable code for requesting at least one vehicle message for the set of vehicle parameters from a database; and
    computer readable code for generating the custom message set responsive to the vehicle messages.

11. The computer readable medium of claim 10, further comprising:
    computer readable code transmitting the generated custom message set to a vehicle client.

12. The computer readable medium of claim 11, wherein the computer readable code for transmitting the generated custom message set to the vehicle client comprises:
    computer readable code for passing the custom message set to a vehicle session manager;
    computer readable code for assigning a priority value to the custom message set based on at least one communication priority value;
    computer readable code for passing the custom message set to one of a plurality of message queues based on the priority value; and
    computer readable code for transmitting the custom message set to the vehicle client based on the message queue the custom message set is located within.

13. The computer readable medium of claim 12, wherein the at least one communication priority is determined using factors selected from the group consisting of: the contents of the custom message set, vehicle client conditions, message set size, and application related priority.

14. The computer readable medium of claim 10, wherein the vehicle message service request includes vehicle information, service-level information, and at least one service request.

15. The computer readable medium of claim 10, wherein the computer readable code for determining at least one set of vehicle parameters based on the received vehicle message service request comprises:
    computer readable code for analyzing the received vehicle message service request for vehicle information, service-level information, and at least one service request;
    computer readable code for producing a set of vehicle parameters for each service request and associated vehicle information and service-level information; and
    computer readable code for producing a database query based on the at least one set of vehicle parameters.

16. The computer readable medium of claim 10, wherein the database includes a lookup table having at least one associated vehicle message for each of the at least one set of vehicle parameters.

17. The computer readable medium of claim 10, wherein the computer readable code for generating the custom message set responsive to the received vehicle parameters comprises:
    computer readable code for producing an object including the vehicle messages based on a received vehicle message for each of the at least one set of vehicle parameters from the database.

18. The computer readable medium of claim 10, wherein the vehicle messages are selected from the group consisting of: proprietary over-the-air messages, proprietary vehicle LAN messages, and OEM vehicle bus messages.

19. A system for providing a custom message set within a vehicle message service system, the system comprising:

means for receiving at least one vehicle message service request;

means for determining at least one set of vehicle parameters based on the received vehicle message service request;

means for requesting at least one vehicle message for the set of vehicle parameters from a database; and means for generating the custom message set responsive to the vehicle messages.

\* \* \* \* \*